(12) United States Patent

Stroupe et al.

(10) Patent No.: US 7,933,959 B2
(45) Date of Patent: Apr. 26, 2011

(54) NOTIFICATION BREAKTHROUGH STATUS AND PROFILE

(75) Inventors: Autumn L. Stroupe, North Bend, WA (US); David W. Flynt, Lake Forest Park, WA (US); Marc W. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 11/067,116

(22) Filed: Feb. 25, 2005

(65) Prior Publication Data

US 2006/0195528 A1     Aug. 31, 2006

(51) Int. Cl.
*G06F 15/16* (2006.01)
(52) U.S. Cl. ............... 709/206; 709/228; 455/412.2; 455/404.1; 715/747; 715/864
(58) Field of Classification Search .......... 709/204–206, 709/220–229; 455/456.1–456.6, 411–417, 455/556.2, 566–567; 715/758; 379/201.08, 379/207.03, 208.01, 210.02
See application file for complete search history.

(56) References Cited

U.S. PATENT DOCUMENTS

| | | | |
|---|---|---|---|
| 7,116,976 B2 * | 10/2006 | Thomas et al. ............... 455/417 |
| 7,127,238 B2 * | 10/2006 | Vandermeijden et al. .... 455/415 |
| 7,248,881 B2 * | 7/2007 | Shostak ...................... 455/456.1 |
| 7,284,033 B2 * | 10/2007 | Jhanji ........................... 709/206 |
| 7,287,056 B2 * | 10/2007 | Loveland et al. ............. 709/206 |
| 7,321,920 B2 * | 1/2008 | Washburn ...................... 709/206 |
| 7,330,895 B1 * | 2/2008 | Horvitz ......................... 709/227 |
| 7,337,181 B2 * | 2/2008 | Horvitz ......................... 707/101 |
| 7,373,181 B2 * | 5/2008 | Vogedes et al. ............... 455/567 |
| 7,499,974 B2 * | 3/2009 | Karstens ....................... 709/206 |
| 7,574,193 B2 * | 8/2009 | Hulkkonen et al. ........ 455/404.1 |
| 2002/0083136 A1 * | 6/2002 | Whitten, II .................... 709/205 |
| 2002/0128033 A1 * | 9/2002 | Burgess ......................... 455/528 |
| 2003/0225797 A1 | 12/2003 | Shields et al. |
| 2004/0044736 A1 * | 3/2004 | Austin-Lane et al. ........ 709/206 |
| 2004/0075687 A1 | 4/2004 | Oshiro et al. |
| 2004/0111478 A1 * | 6/2004 | Gross et al. .................... 709/206 |
| 2004/0210851 A1 | 10/2004 | Premchandran et al. |
| 2004/0229600 A1 * | 11/2004 | Saez et al. ..................... 455/417 |
| 2006/0019638 A1 * | 1/2006 | Chiu et al. .................. 455/412.2 |
| 2006/0094404 A1 * | 5/2006 | Burgess ...................... 455/412.1 |
| 2006/0167991 A1 * | 7/2006 | Heikes et al. ................. 709/204 |
| 2006/0212561 A1 * | 9/2006 | Feng ............................. 709/223 |
| 2006/0259565 A1 * | 11/2006 | Cheung et al. ................ 709/206 |
| 2007/0105533 A1 * | 5/2007 | Chiu et al. .................. 455/412.2 |
| 2008/0057910 A1 * | 3/2008 | Thoresson et al. .......... 455/412.1 |
| 2010/0130175 A1 * | 5/2010 | Seligmann ................. 455/412.2 |

* cited by examiner

*Primary Examiner* — William C. Vaughn, Jr.
*Assistant Examiner* — Greg Bengzon
(74) *Attorney, Agent, or Firm* — Klarquist Sparkman, LLP

(57) ABSTRACT

Techniques and tools are described for notifications of events, such as receipt of messages, and specifically to tools and techniques related to breakthrough notification profile and status. For example, it is determining whether a profile is active and whether a contact associated with an event is identified as having a status related to the profile. If the profile is active, a notification related to the event is issued only if the sender has the status. If the profile is not active, the notification is issued whether or not the sender has the status.

18 Claims, 6 Drawing Sheets

Figure 1

Software 180 Implementing Breakthru Profile and Status

NOTIFICATION BREAKTHROUGH STATUS AND PROFILE

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Described tools and techniques relate to notifications, and specifically to notification breakthrough status and profile.

BACKGROUND

Mobile communication devices, such as personal desktop assistants, contemporary mobile telephones, hand-held computers, tablet personal computers, laptop personal computers, wearable computers and the like are becoming popular user tools. In general they have become small enough to be extremely convenient, while consuming less battery power, and at the same time have become capable of running more powerful applications. Such communication devices are often used to keep a user updated with current information by notifying the user of incoming messages. Such messages include audio messages such as telephone calls or voicemail, and textual messages such as e-mail, SMS messages, and instant messages.

Currently, mobile devices notify users generally equally for new email, new SMS messages, new calls, and new voicemail messages with visual and audio cues. Users have the option to give special ring tones to help them distinguish a known caller from an unknown caller or to give different ring tones to particular individuals. However, the ability to manage and limit a user's availability still requires user attention and effort. For example, mobile device users often manage their availability to others by glancing at caller ID to see if they should stop what they are doing to answer an incoming call.

SUMMARY

In summary, the detailed description is directed to various techniques and tools for notifications of incoming communications, and specifically to tools and techniques related to breakthrough notification profiles and status. Described embodiments implement one or more of the described techniques and tools including, but not limited to, the following:

In one aspect, a computer implemented method includes determining whether a profile is active and whether a contact associated with an event is identified as having a status related to the profile. If the profile is active, a notification related to the event is issued only if the contact has the status. If the profile is not active, the notification is issued whether or not the contact has the status.

In another aspect, a communication device includes a memory storing computer software. A processor is programmed to execute the software to accept user input indicating that a contact should have breakthrough status, and to give the contact breakthrough status. The processor is programmed to further execute the software to receive a message from a sender and determine whether the sender is a contact with breakthrough status and whether a breakthrough only profile is active at the time the message is received. If either the breakthrough only profile is not active or the sender has breakthrough status, a notification is issued. However, if the breakthrough only profile is active and the sender does not have breakthrough status, then the notification is not issued.

In another aspect, a computer-readable medium stores computer-executable instructions for causing a computer system to perform a method. The method includes maintaining information related to a set of contacts and tracking a subset of contacts from the set of contacts, the subset of contacts having breakthrough status. A message is received from a sender, and it is determining whether the sender belongs to the subset of contacts and whether a breakthrough only profile is active at the time the message is received. If the profile is active, a notification is issued only if the sender has the status. If the profile is not active, the notification is issued whether or not the sender has the status.

The various techniques and tools can be used in combination or independently.

Additional features and advantages will be made apparent from the following detailed description of different embodiments that proceeds with reference to the accompanying drawings.

DETAILED DESCRIPTION

The present application relates to techniques and tools for reminders and specifically to tools and techniques related to notification breakthrough status and profile. Described embodiments implement one or more of the described techniques and tools.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific user interfaces, other user interfaces also can be used.

The various techniques and tools can be used in combination or independently. Different embodiments implement one or more of the described techniques and tools. Some techniques and tools described herein can be used in a mobile computing device, such as a mobile telephone or handheld computer, or in some other computing device, for example a desktop computer.

I. Computing Environment

Figure 1:
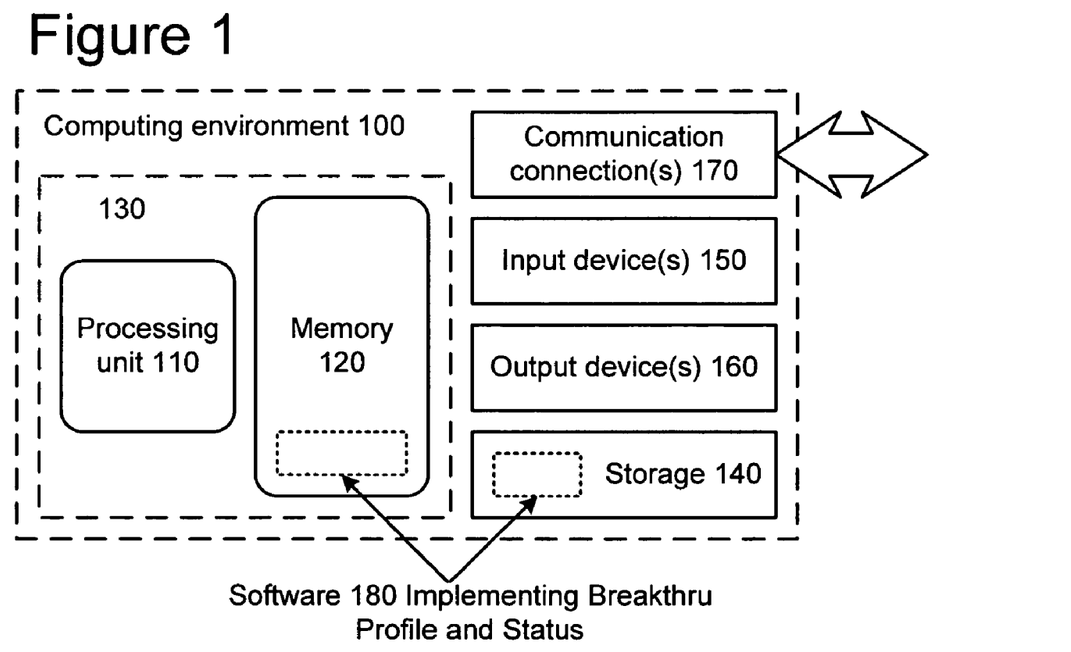
FIG. 1 is a block diagram of a suitable computing environment in conjunction with which described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing notification breakthrough status and profile with one or more of the described techniques and tools.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, or DVDs. The storage (140) stores instructions for the software (180) implementing notification breakthrough lists.

The input device(s) (150) may be a touch input device such as a keyboard, mouse, pen, or trackball, a touch screen, a voice input device, a scanning device, or another device that provides input to the computing environment (100). The input device(s) (150) may also be a sound card, video card, TV tuner card, or similar device that accepts audio or video input in analog or digital form, or a CD-ROM or CD-RW that reads information into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Communication Device

Figure 2:
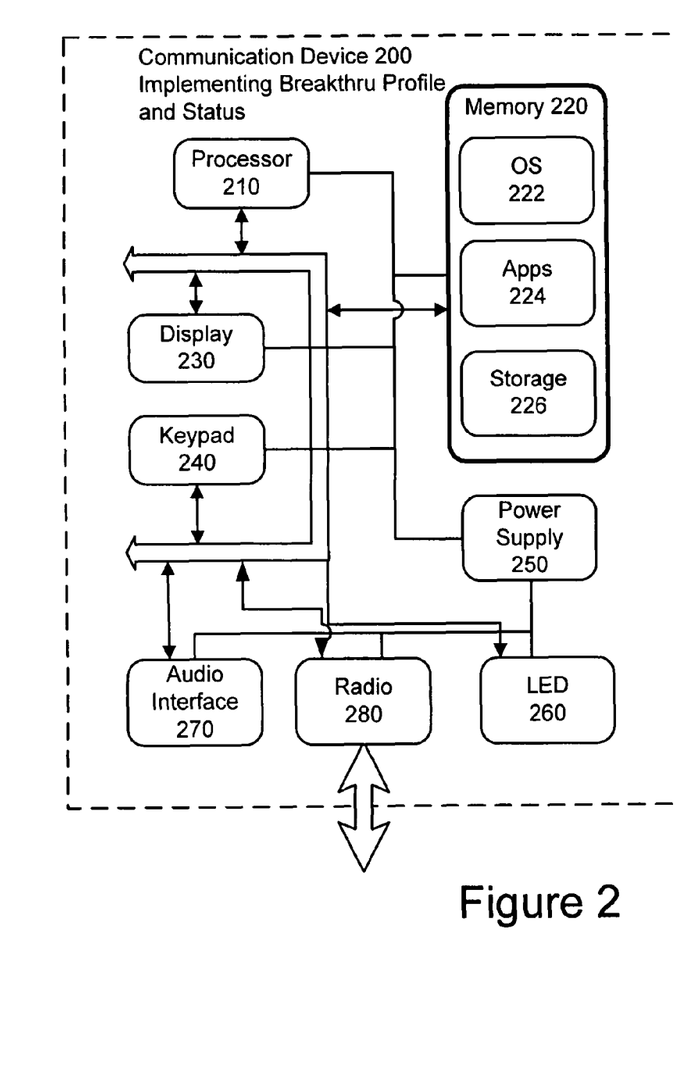
FIG. 2 is a block diagram of a suitable communication device in conjunction with which described embodiments may be implemented.

The computing environment may be in the form of a communication device, such as the communication device (200) illustrated as a functional block diagram in FIG. 2. The communication device (200) is capable of implementing one or more of the tools and techniques related to breakthrough profile and status described below. The communication device (200) may be implemented as one or more desktop personal computers, multiprocessor systems, microprocessor-based or programmable consumer electronics, network PCs, and the like. In one implementation, the communication device (200) is a mobile communication device.

The communication device (200) may include many more components than those shown in FIG. 2. The components shown, however, are sufficient to disclose an illustrative embodiment for implementing the disclosed tools and techniques.

As shown in FIG. 2, the communication device (200) includes a processor (210), a memory (220), a display (230), and a keypad (240). The memory (220) generally includes both volatile memory (e.g., RAM) and non-volatile memory (e.g., ROM, Flash Memory, or the like). The communication device (200) includes an operating system (222), such as the Windows Mobile operating system from Microsoft Corporation or other such operating system, which is resident in the memory (220) and executes on the processor (210). The keypad (240) may be a push button numeric dialing pad (such as on a typical telephone) or a multi-key keyboard (such as a conventional keyboard). The display (230) may be a liquid crystal display, or any other type of display commonly used in mobile computing devices. For example, the display (230) may be touch-sensitive, and would then also act as an input device.

One or more application programs (224) are loaded into the memory (220) and run on the operating system (222). Instructions for implementing notification breakthrough profile and status may be included in one or more application programs (224) and/or in the operating system (222). Examples of application programs include phone dialer programs, a switch manager, e-mail programs, calendar programs, word processing programs, spreadsheet programs, and so forth. The communication device (200) also includes non-volatile storage (226) within the memory (220). Non-volatile storage (226) may be used to store persistent information which should not be lost if the communication device (200) is powered down. The application programs (224) may use and store information in storage (226), such as e-mail, SMS, MMS, or other messages used by an e-mail application, appointment information used by a calendar program, documents used by a word processing application, and the like. A synchronization application may also reside on the communication device (200) and is programmed to interact with a corresponding synchronization application resident on a host computer to keep the information stored in storage (226) synchronized with corresponding information stored at the host computer.

The communication device (200) also includes a power supply (250), which may be implemented as one or more batteries. The power supply (250) might further include an external power source, such as an AC adapter or a powered docking cradle that supplements or recharges the batteries.

The communication device (200) is also shown with two types of external notification mechanisms: an LED (260) and an audio interface (270). Other components, such as the display (230) may also operate as notification mechanisms. These devices may be directly coupled to the power supply (250) so that when activated, they remain on for a duration dictated by the notification mechanism even though the processor (210) and other components might shut down to conserve battery power. The LED (260) may be programmed to remain on indefinitely until the user takes action to indicate the powered-on status of the device. The audio interface (270) is used to provide audible signals to and receive audible signals from the user. For example, the audio interface (270) may be coupled to a speaker for providing audible output and to a microphone for receiving audible input, such as to facilitate a telephone conversation.

The communication device (200) also includes a radio (280) that performs the function of transmitting and receiving radio frequency communication. The radio (280) facilitates wireless connectivity between the communication device (200) and the outside world, for example via a communication carrier or service provider. Transmissions to and from the radio (280) are conducted under control of the operating system (222). In other words, communications received by the radio (280) may be disseminated to the application programs (224) via the operating system (222), and vice versa.

The radio (280) allows the communication device (200) to communicate with other computing devices, such as over a network. The radio (280) is an example of communication media discussed above.

III. Display Layout Implementation

Figure 3:
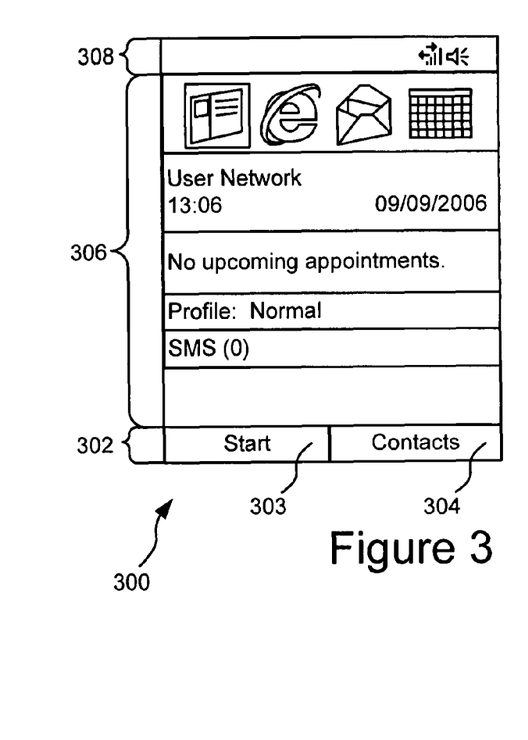
FIG. 3 is a diagram of a general display layout in conjunction with which described embodiments may be implemented.

FIG. 3 is a diagram illustrating the layout of an exemplary display screen (300) of a computing device such as the communication device (200) described above. The display screen (300) is a home screen that generally acts as an entry point to other screens and features. However, similar display features are present on lower level screens that are accessed from the home screen, as will become apparent from the description of other screens below. Generally, the implementation of the display screen (300) illustrated in FIG. 3 includes a soft key bar (302) along the bottom of the display. The soft key bar (302) includes a left soft key (303) and a right soft key (304). Each soft key (303, 304) displays a particular action, menu, screen, or other feature that is accessed by actuating a corresponding button on the communication device (referred to herein as actuating the soft key). The soft keys may be specific to the context of the application or feature that is currently being accessed. In some implementations, the right soft key (304) is used by applications to display context-specific menus, and the left soft key is used by applications to display context specific actions. In the particular home display screen (300) illustrated in FIG. 3, the left soft key (303) can be actuated to display a start screen that lists applications and features available on the communication device, such as calendar, e-mail, voicemail, call history, contacts, settings, and the like. The right soft key (304) can be actuated to display the contacts screen that lists information for available contacts.

Above the soft key bar (302) is a main screen area (306) that displays various information depending on the context. In the home screen, the main screen area (306) can include icons to directly access particular features or applications, as well as status information. Above the main screen (306) is a title bar (308), which can display application and status information, such as the title of the current application, the date, bars indicating radio signal strength, and the like.

The particular display screens described and illustrated herein are described as particular screens that can implement the described tools and techniques. However, various other types of display screen layouts or other types of user interfaces, such as audio interfaces, could be used.

IV. Notification Breakthrough Profile

Currently, mobile devices notify users in the same general manner for new email, new SMS messages, new calls, and new voicemail messages with visual and audio cues. Users have the option to give special ring tones to help them distinguish a known caller from an unknown caller or to give different ring tones to particular individuals. However, the ability to manage and limit a user's availability still requires user attention and effort. For example, mobile device users often manage their availability to others by glancing at caller ID to see if they should stop what they are doing to answer an incoming call. The breakthrough profile and status described below allows users to give preference to the people that should be able to reach them even when they are busy. With the breakthrough profile on, the user is notified only when someone with breakthrough status is trying to reach the user. While the breakthrough profile is active, either the user is not notified of messages from senders without breakthrough status, or the user is notified in a different manner (such as by a screen display for senders without breakthrough status versus an audible notification for users with breakthrough status). When the breakthrough profile is inactive, then no distinction is made between senders with breakthrough status and senders without breakthrough status.

Figure 4:
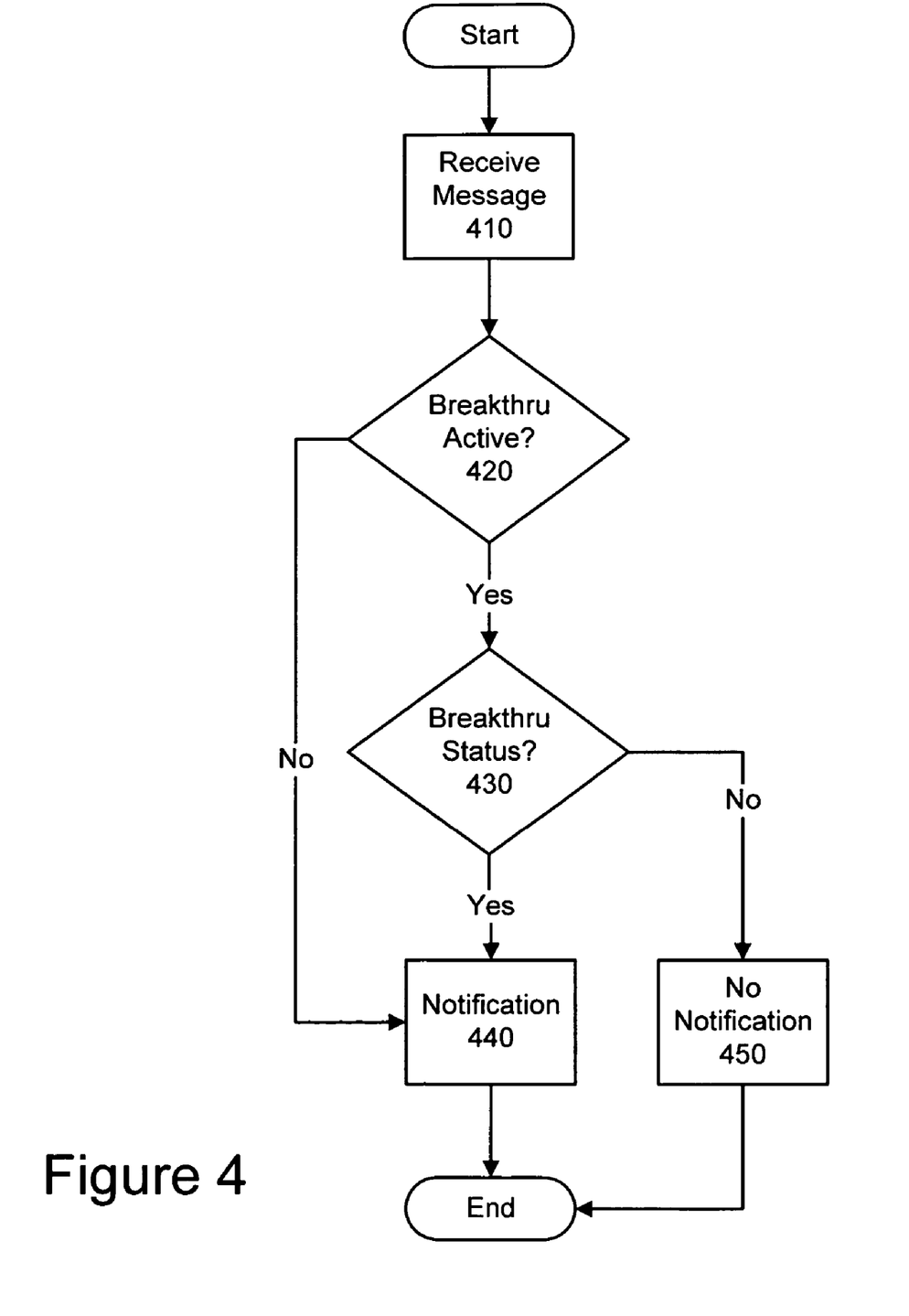
FIG. 4 is a flow diagram illustrating notification of a user for a new message when a breakthrough profile is available.
Figure 5:
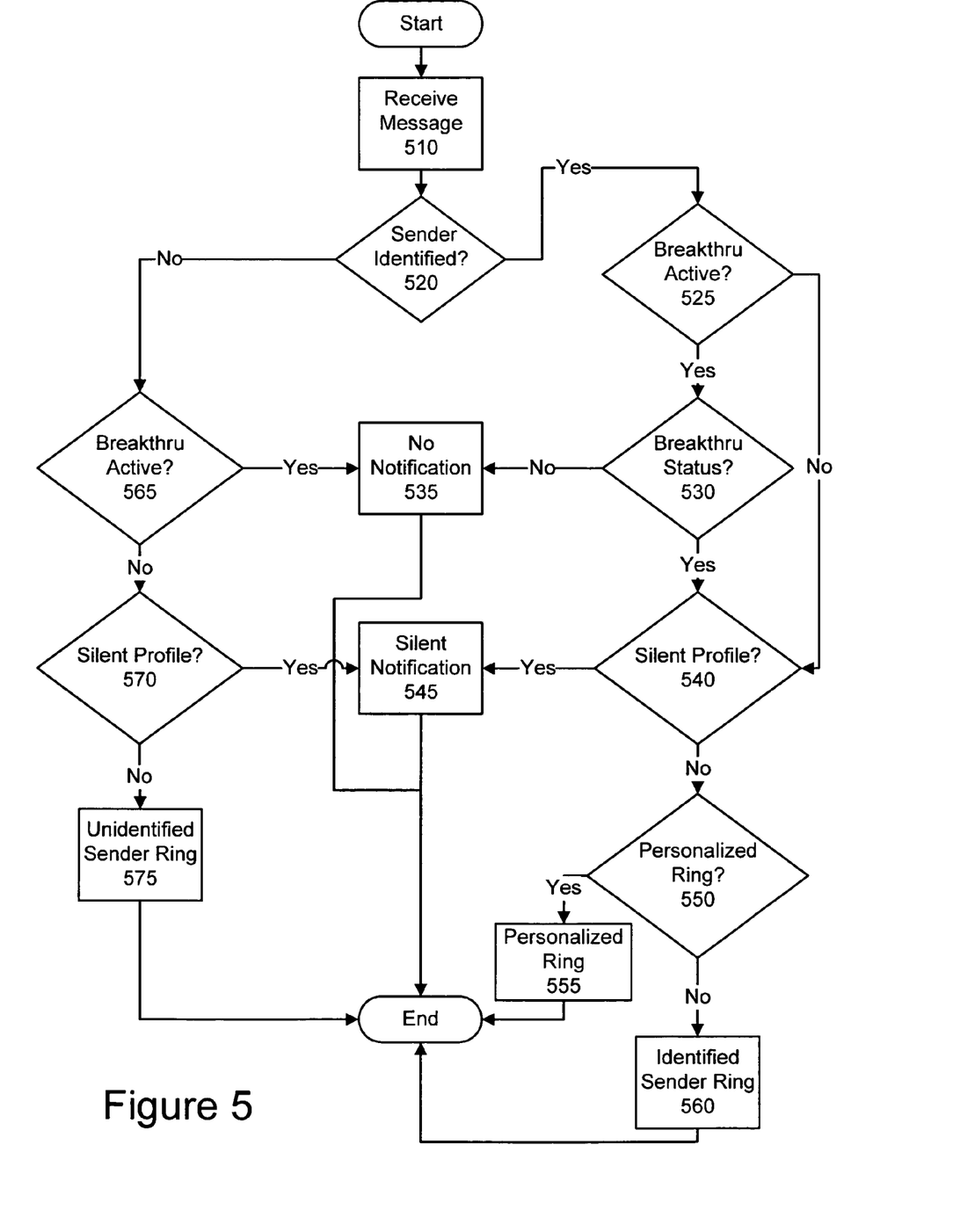
FIG. 5 is a flow diagram illustrating notification of a user for a new message when a breakthrough profile and other notification features are available.

FIGS. 4 and 5 illustrate flow diagrams for using a breakthrough profile, and specifically for receiving a message and determining whether to notify a user that the message has been received. Referring to FIG. 4, a message is received (410). The message could be any type of incoming communication for which a user might desire to be notified. For example, the message could be an incoming telephone call, voicemail message, E-mail message, SMS message, instant message, or the like. Moreover, the message could be a notification that a message has been received elsewhere, such as a notification that a new voicemail message has been received by a service provider computer and is available to be downloaded.

It is determined whether the breakthrough profile is active (420). If the breakthrough profile is active, then it is determined whether the sender of the message has breakthrough status (430). If the sender has breakthrough status, then a notification is provided for the incoming message (440). Similarly, if it is determined that the breakthrough profile is not active, then a notification is provided for the incoming message (440). The notification could be visible or audible. For example, the notification could be a ring, a vibration of a device, a message on a display screen, an LED indicator, or the like. If the sender does not have breakthrough status and the breakthrough profile is active, then the notification is not provided (450). In some implementations the user is provided no notification of a message received from a sender without breakthrough status. In other implementations, however, the user may receive a different notification if the sender does not have breakthrough status. For example, if the breakthrough profile is active, a user may be notified by an audible ring or another audible notification if the sender has breakthrough status, but only notified by a visual notification, such as a flashing LED or an item on a display screen, if the sender does not have breakthrough status. A user may have the ability to customize the breakthrough profile, such as by choosing between different implementations.

As is illustrated by the flow diagram of FIG. 5, the breakthrough profile may be used in conjunction with other settings to determine what type of notification, if any, should be provided. FIG. 5 is a flow for determining what, if any, notification should be given for an incoming message. In the implementation of FIG. 5, there is one ring tone associated generally with identified senders and another ring tone associated generally with unidentified senders. Additionally, there is a silent profile available, as well as personalized ring tones for individual senders. Referring to FIG. 5, a message is received (510), and it is determined whether a sender of the message is identified (520).

If the sender is identified, it is determined whether the breakthrough profile is active (525). If the breakthrough profile is active, then it is determined whether a sender of the message has breakthrough status (530). If the sender does not have breakthrough status, then no notification is given (535). If the sender has breakthrough status, or if the breakthrough profile is not active, then some notification is given (so long as there is no other setting prohibiting the notification), and the proper type of notification is determined. In this implementation, to determine what type of notification to give, it is first determined whether a silent profile is active (540). If the silent profile is active, then a silent notification is given (545). If the silent profile is not active, then it is determined whether a personalized ring tone is associated with the sender of the message (550). The personalized tone could be a personalized ringer, buzzer, tune, or the like. If a personalized ring tone is associated with the sender, then the associated tone is played (555). If a personalized ring tone is not associated with the identified sender, then a general ring tone associated with identified senders is given (560).

If the sender is not identified, then it is determined whether the breakthrough profile is active (565). If the breakthrough profile is active, then no notification is given (535). If the breakthrough profile is not active, then it is determined whether a silent profile is active (570). If the silent profile is active and the breakthrough profile is not active, then the silent notification (545) is given. If neither the breakthrough profile nor the silent profile are active, then a ring tone associated with unidentified senders is given (575).

The flows illustrated in FIGS. 4 and 5 could also be used for properly notifying the user regarding events other than incoming messages, such as appointment reminders and task reminders. Whether the event is an incoming message or some other type of event, if the breakthrough profile is active it is determined whether a contact associated with the event (such as the sender of a message, the person with whom a user has an appointment, etc.) has breakthrough status, and a notification is given if the contact has such status. If the contact does not have such status, then the notification is not given. In this way, a user is able to discriminate between contacts that warrant issuing a notification while the breakthrough status is active, and those that do not.

V. Notification Breakthrough Profile Example Display Screens

Figure 6:
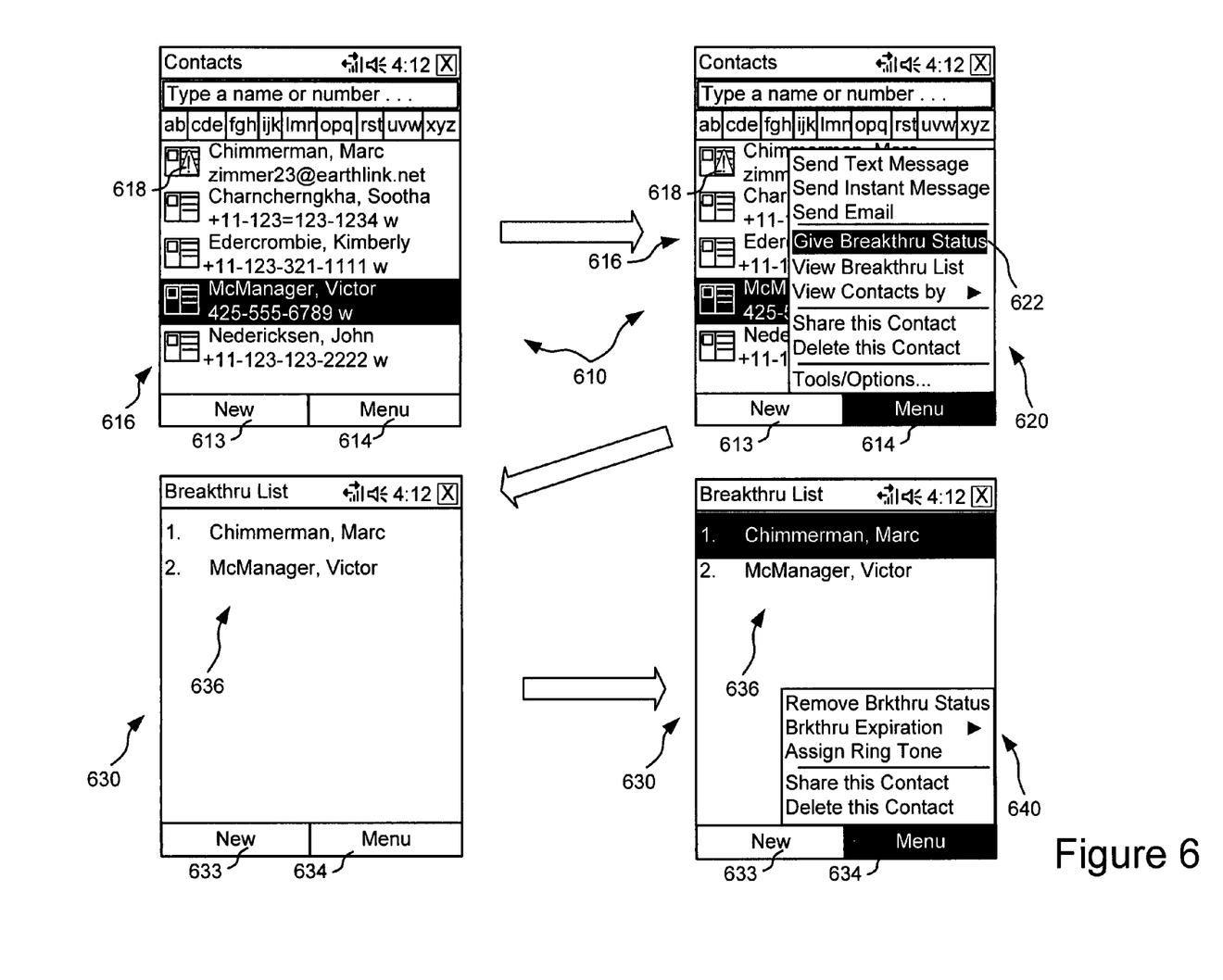
FIG. 6 is a diagram illustrating an exemplary flow of display screens while giving a contact breakthrough status.
Figure 7:
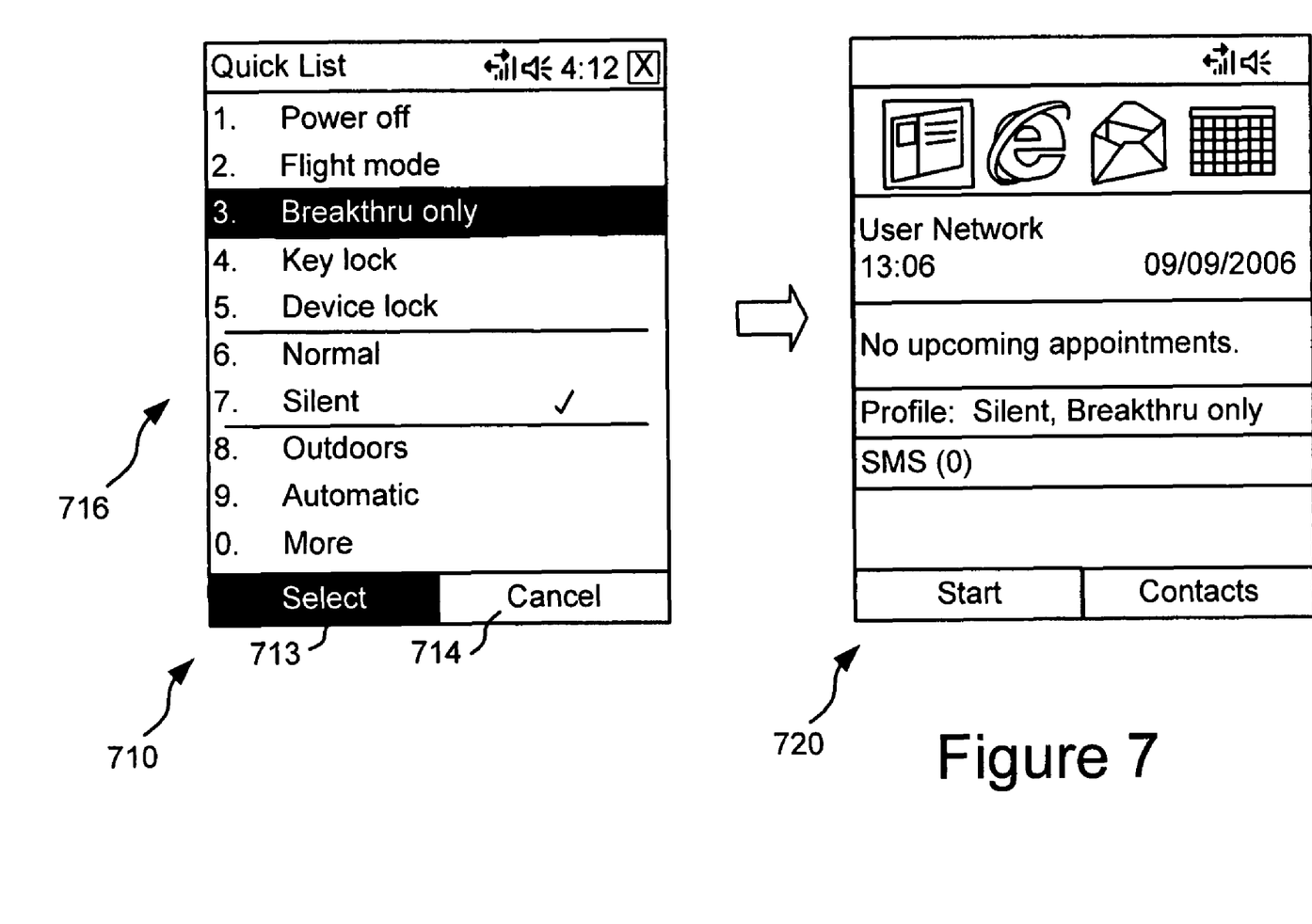
FIG. 7 is a diagram illustrating an exemplary flow of display screens during activation of a breakthrough profile.

FIG. 6 illustrates user interface display screens for giving a contact breakthrough status and FIG. 7 illustrates user interface display screens for activating a breakthrough profile. However, other display screen layouts and even other types of user interfaces, such as audio user interfaces, could alternatively be used.

Referring to FIG. 6, a contacts screen (610) is displayed. Among other things, the contacts screen (610) includes a left "new" soft key (613) for entering information for a new contact, and a right "menu" soft key (614) for accessing pertinent menu items. The main screen area includes a contacts list (616) displaying the names of various contacts. The contacts can be associated with particular natural persons, or they can be associated with other things, such as groups of people, business entities, or the like. The information associated with each contact can include information such as titles, telephone numbers, physical addresses, E-mail addresses, notes, pictures and the like. On the contacts list, there is an icon next to identifying information for each contact. The contact listings can be highlighted. In the screen shown, the contact identified as "Victor McManager" is highlighted. The breakthrough status of a contact can be displayed on the icon by a breakthrough identifier (618), such as a shape enclosing an exclamation point. Thus, the display screen (610) shows that the contact "Marc Chimmerman" has been given breakthrough status. Of course, particular colors or other shapes could be used as identifiers.

If the menu key (614) is actuated, then a menu (620) is displayed over the contacts list (616). The menu (620) lists several items that can be actuated to access various features. Some items access general features, and others access features that allow specific actions to be performed with respect to the highlighted contact. Included in the list is a "Give Breakthru status" item (622). If the "Give Breakthru status" item (622) is actuated, then the highlighted contact, here "Victor McManager," is given breakthrough status.

Additionally, a breakthrough list display screen (630) is displayed when a contact is given breakthrough status. The breakthrough list display screen (630) includes a left "new" soft key (633), which can be actuated to enter information for a new contact. The breakthrough list display screen (630) also includes a right "menu" soft key (634), which can be actuated to display a menu (640) to access pertinent features. The menu (640) can include an item to remove breakthrough status from a highlighted contact. The menu (640) can also include an item to provide an expiration for the breakthrough status of a highlighted contact. For example, the user could specify that the contact's breakthrough status expire in two days. The menu (640) can also include items to access other features, such as assigning personalized ring tones, sharing a contact, and deleting a contact.

The breakthrough list display screen (630) can be displayed each time a user gives a contact breakthrough status. In this way, the user can keep apprised of the contacts that have breakthrough status, and can remove breakthrough status from contacts that should no longer have such status. The breakthrough list display screen (630) may not be displayed every time a contact is given breakthrough status. For example, the screen may only be displayed if a specified period of time has passed since the screen was displayed previously. As another example, the screen may only be displayed if there are at least a specified number of contacts with breakthrough status. Also, the breakthrough list display screen (630) may be accessed in other ways. For example, the screen may be accessed from the quick list discussed below.

Referring to FIG. 7, a quick list display screen (710) includes a left "select" soft key (713) that can be actuated to select an item. The quick list display screen (710) also includes a right "cancel" soft key (714) that can be actuated to cancel the quick list display screen (710) and return to another display screen, such as a home screen. The main screen area includes the quick list (716). A check mark next to a profile indicates that the profile is active. For example, the check mark next to "silent" in the quick list (716) indicates that the silent profile is currently active. If the breakthrough only item is highlighted as shown, and the "select" soft key (713) is actuated, then the breakthrough profile is activated and the home screen (720) is displayed. As discussed above, with the breakthrough only profile active the device will only notify the user if a message is received from a contact with breakthrough status.

Of course, breakthrough status could be activated and deactivated in other ways, such as by actuating a soft key or a menu that is displayed in response to actuating a soft key in a particular context.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, we claim as my invention all such embodiments as may come within the scope and spirit of the following claims and equivalents thereto.

We claim:

1. A method comprising:
   using a communication device:
      in a user interface, displaying a list of contacts;
      receiving a user indication to display a menu for a selected contact out of the list of contacts;
      responsive to receiving the user indication to display the menu, displaying a menu for the selected contact, wherein the menu comprises a plurality of options including an option to give the selected contact breakthrough status;
      via the menu for the selected contact, receiving at the communication device a user indication to give the selected contact breakthrough status;
      responsive to receiving the user indication at the communication device to give the selected contact breakthrough status via the menu for the selected contact, giving the selected contact breakthrough status and displaying in the user interface a list of breakthrough contacts consisting of contacts having breakthrough status;
      receiving a user indication of a selection of a contact from the list of breakthrough contacts;
      responsive to receiving the user indication of a selection of a breakthrough contact, displaying a second menu for the selected breakthrough contact, the second menu comprising a plurality of options including an option to provide an expiration for the breakthrough status of the selected breakthrough contact selected from the list of contacts having breakthrough status and an option to assign a personalized audible notification to the selected breakthrough contact selected from the list of contacts having breakthrough status;
      receiving an indication of an incoming communication;
      determining whether a breakthrough profile is active;
      determining whether a contact associated with the incoming communication is identified as having a breakthrough status; and
      when the breakthrough profile is active, issuing a notification indicating the incoming communication only if the contact has the breakthrough status, wherein the notification is a personalized audible notification if the contact has been assigned an personalized audible notification.

2. The method of claim 1, wherein the incoming communication is a message selected from the group consisting of a voicemail message, an e-mail message, an instant message, and a text message.

3. The method of claim 1, wherein the notification is audible.

4. The method of claim 3, further comprising issuing a non-audible notification if the breakthrough profile is active and the contact does not have the breakthrough status.

5. The method of claim 1, wherein no notification is issued while the breakthrough profile is active if the contact does not have the breakthrough status.

6. The method of claim 1, wherein multiple contacts are identified as having the breakthrough status.

7. A communication device comprising:
   a memory storing computer software;
   a processor programmed to execute the software to:
      in a user interface, display a list of contacts;
      receive a user indication to display a menu for a selected contact out of the list of contacts;
      responsive to receiving the user indication to display the menu, display a menu for the selected contact, wherein the menu comprises a plurality of options including an option to give the selected contact breakthrough status;
      via the menu for the selected contact, receiving a user indication at the communication device to give the selected contact breakthrough status;
      responsive to receiving the user indication at the communication device to give the selected contact breakthrough status via the menu for the selected contact, giving the selected contact breakthrough status and displaying in the user interface a list of breakthrough contacts consisting of contacts having breakthrough status;
      receiving a user indication of a selection of a contact from the list of breakthrough contacts;
      responsive to receiving the user indication of a selection of a breakthrough contact, displaying a second menu for the selected breakthrough contact, the second menu comprising a plurality of options including an option to provide an expiration for the breakthrough status of the selected breakthrough contact selected from the list of contacts having breakthrough status and an option to assign a personalized audible notification to the selected breakthrough contact selected from the list of contacts having breakthrough status;
      receive a message from a sender;
      determine whether the sender is a contact with breakthrough status at the time the message is received;
      determine whether a breakthrough only profile is active at the time the message is received;
      when either the breakthrough only profile is not active or the sender has breakthrough status, issue a notification, wherein the notification is a personalized audible notification if the sender is a contact who has been assigned a personalized audible notification; and when the breakthrough only profile is active and the sender does not have breakthrough status, not issue the notification.

8. The device of claim 7, wherein the processor is programmed to further execute the software to assign an expiration time for the breakthrough status of the contact selected from the list of contacts having breakthrough status.

9. The device of claim 7, wherein the notification is audible.

10. The device of claim 9, wherein the processor is programmed to further execute the software to issue a non-audible notification if the breakthrough only profile is active and the sender does not have breakthrough status.

11. The device of claim 9, wherein no notification is issued while the breakthrough only profile is active if the sender does not have breakthrough status.

12. The device of claim 7, wherein multiple contacts have breakthrough status.

13. The device of claim 7, wherein the communication device is a mobile device.

14. A computer-readable storage medium not consisting of a signal, the computer-readable storage medium storing computer-executable instructions for causing a computer system to perform a method comprising:
   maintaining information related to a set of contacts;
   in a user interface, displaying the set of contacts;
   receiving a user indication to display a menu for a selected contact out of the set of contacts;
   responsive to receiving the user indication to display the menu, displaying a menu for the selected contact, wherein the menu comprises an option to give the selected contact breakthrough status;
   via the menu for the selected contact, receiving a user indication at the computer system to give the selected contact breakthrough status;
   responsive to receiving the user indication at the computer system to give the selected contact breakthrough status via the menu for the selected contact, giving the selected contact breakthrough status and displaying in the user interface a list of breakthrough contacts consisting of contacts having breakthrough status;
   receiving at the user interface a user indication of a selection of a contact from the list of breakthrough contacts;
   responsive to receiving the user indication of a selection of a breakthrough contact, displaying a second menu for the selected breakthrough contact, the second menu comprising a plurality of options including an option to provide an expiration for the breakthrough status of the selected breakthrough contact selected from the list of contacts having breakthrough status and an option to assign a personalized audible notification to the selected breakthrough contact selected from the list of contacts having breakthrough status;
   tracking a subset of contacts from the set of contacts, the subset of contacts having breakthrough status;
   receiving a message from a sender;
   determining whether the sender belongs to the subset of contacts having breakthrough status;
   determining whether a breakthrough only profile is active at the time the message is received;
   if the breakthrough only profile is active, issuing a first type of notification only if the sender has the breakthrough status, otherwise, issuing a second type of notification, wherein the first type of notification is audible notification if the sender is a contact who has been assigned a personalized audible notification; and
   if the breakthrough only profile is not active, issuing the first type of notification whether or not the sender has the breakthrough status.

15. The computer-readable storage medium of claim 14, wherein the first type of notification is an audible notification and the second type of notification is a screen display notification.

16. A mobile communication device comprising:
   a processor;
   a hardware display; and
   stored instructions executable by the processor to perform:
      on the hardware display, displaying a list of contacts stored by the device, the list of contacts comprising breakthrough identifiers displayed for contacts having a breakthrough status, wherein the breakthrough identifiers are a shape, an icon or a particular color;
      receiving a user indication of a selection of a selected contact out of the list of contacts;
      receiving a user indication to display a menu for the selected contact;
      responsive to receiving the user indication to display the menu, on the hardware display, displaying a menu for the selected contact, wherein the menu comprises an option to send a text message to the selected contact, an option to share the selected contact, an option to delete the selected contact, and an option to give the selected contact breakthrough status;
      via the menu for the selected contact, receiving a user indication at the mobile communication device to give the selected contact breakthrough status;
      responsive to receiving the user indication at the mobile communication device to give the selected contact breakthrough status via the menu for the selected contact, giving the selected contact breakthrough status and displaying a list of contacts consisting of contacts having breakthrough status;
      receiving a user indication of a selection of a selected contact out of the list of contacts having breakthrough status;
      responsive to receiving a user indication of a selected contact out of the list of contacts having breakthrough status, displaying a second menu for the selected contact having breakthrough status, the second menu comprising a plurality of options including an option to provide an expiration for the breakthrough status of the selected contact having breakthrough status and an option to assign a personalized audible notification to the selected breakthrough contact selected from the list of contacts having breakthrough status;
      receiving an indication of an incoming communication;
      determining whether a breakthrough profile is active;
      determining whether a contact associated with the incoming communication is identified as having a breakthrough status;
      as a result of determining the breakthrough profile is active and the contact has breakthrough status, sounding an audible notification indicating the incoming communication, wherein the audible notification is a personalized audible notification if the contact has been assigned a personalized audible notification.

17. The computer-implemented method of claim 1 wherein the menu further comprises an option to send a text message to the selected contact.

18. A method comprising:
   using a communication device:
      in a user interface, displaying a list of contacts;

receiving a user indication to select a contact from the list of contacts;

responsive to receiving the user indication to select the contact, displaying a first menu, wherein the first menu comprises an option to give the selected contact breakthrough status;

via the first menu for the selected contact, receiving a user indication at the communication device to give the selected contact breakthrough status;

responsive to receiving the user indication at the communication device to give the selected contact breakthrough status via the menu for the selected contact, giving the selected contact breakthrough status and displaying a list of breakthrough contacts consisting of contacts having breakthrough status;

receiving a user indication of a selection of a breakthrough contact from the list of breakthrough contacts;

responsive to receiving the user indication to give the selected breakthrough contact breakthrough status, displaying a second menu for the selected breakthrough contact, the second menu comprising an option to provide an expiration for the breakthrough status of the selected breakthrough contact and an option to assign a personalized audible notification to the selected breakthrough contact selected from the list of contacts having breakthrough status;

receiving an indication of an appointment reminder or a task reminder;

determining whether a breakthrough profile is active;

determining whether a contact associated with the appointment reminder or the task reminder is identified as having a breakthrough status; and when the breakthrough profile is active, issuing a notification indicating the appointment reminder or a task reminder only if the contact has the breakthrough status, wherein the notification is a personalized audible notification if the contact has been assigned an personalized audible notification.

* * * * *